United States Patent [19]

Bernard et al.

[11] 4,143,840

[45] Mar. 13, 1979

[54] ARRESTER NET GEAR FOR AIRCRAFT

[75] Inventors: Jean P. Bernard, Paris; Paul A. Meningand, Clamart, both of France

[73] Assignee: Aerazur Constructions Aeronautiques, Moulineaux, France

[21] Appl. No.: 818,902

[22] Filed: Jul. 25, 1977

[30] Foreign Application Priority Data

Aug. 5, 1976 [FR] France ................................ 76 23917

[51] Int. Cl.² .............................................. B64F 1/02
[52] U.S. Cl. ................................................ 244/110 C
[58] Field of Search ........... 244/110 C, 110 R, 110 A; 404/6; 114/241

[56] References Cited

U.S. PATENT DOCUMENTS 3,069,118  12/1962  Bernard ........................... 244/110 R
3,810,595  5/1974   Doolittle ......................... 244/110 C Primary Examiner—Barry L. Kelmachter
Attorney, Agent, or Firm—William Anthony Drucker

[57] ABSTRACT

This aircraft arrester net gear comprises at least one flexible frame having each at least one elementary net slidably mounted therein, in such a manner that when a forwardly projecting element of the aircraft engages the net the elementary nets can slide in relation to the frame and the horizontal width of the net mesh normally engaged by the aircraft wings is reduced; for this purpose, open-loop slack portions of the horizontal straps of the elementary nets are provided at each end thereof.

2 Claims, 3 Drawing Figures

ARRESTER NET GEAR FOR AIRCRAFT

BACKGROUND OF THE INVENTION

1. Field of the Invention

This invention is directed to improving the operation of barricade or arrester net gears of the type designed for retaining an aircraft at the end of runways notably in case of failure of the aircraft braking system.

2. Description of the Prior Art

Net gears or structures comprising superposed elementary nets have already been proposed in the art, each elementary net consisting of spaced vertical straps tensioned between horizontal straps. When the aircraft engages this net gear, the vertical straps are bent on the aircraft wings somewhat like the belts of a harness, so that each elementary net remains fastened or clings to the aircraft and cannot slip off. This result is obtained so long as the relative spacing of the vertical straps is not excessive and remains within reasonable limits, so that at least one vertical strap remains on each wing. In the case of short-span aircrafts or aircrafts having a pronounced delta configuration, a very reduced relative spacing of these vertical straps is required, so that their number must be increased accordingly, with the attendant shortcomings listed hereinafter:

Firstly, the necessary increment in the number of straps increases the weight and cost of the net gear, and also its wind resistance.

Furthermore, a greater number of straps may cling to inadequate locations or parts of the aircraft, such as aerials, wing slots or jet-engine slots, jet-engine inlets, etc.

Finally, a greater number of vertical straps may be struck by forwardly producing portions or elements of the aircraft, with the likelihood of causing a greater number of horizontal straps to move up or down in front of undesirable parts such as the front or nose landing wheel or undercarriage, or the pilot's cockpit. Now this last objection is of particular importance for cases are known wherein an excessive number of lower horizontal straps engaged by the front undercarriage caused serious damages thereto or even the breakage thereof.

SUMMARY OF THE INVENTION

The aircraft arrester net gear according to this invention overcomes in a particularly efficient manner the above-mentioned shortcomings not only by affording a substantial reduction in the number of vertical straps but also by providing an arrangement such that when a vertical strap is carried along by a forwardly projecting portion of the aircraft the corresponding horizontal strap is raised with a predetermined and substantial time lag, due to lateral sliding of the elementary net, i.e. as a rule after the passage of the front undercarriage.

For this purpose, each elementary net structure, still consisting of vertical straps tensioned between horizontal straps, is so mounted that it can slide on a pair of vertically spaced horizontal straps constituting a carrier structure to be referred to hereinafter as the "frame" of the arrester.

At each end of the elementary net the horizontal straps comprise a slack section permitting the sliding extension or expansion of the net.

This sliding movement is guided along the frame by strap rings disposed between the vertical straps, for example intermediate the ends of each gap formed between two adjacent vertical straps. These strap rings have a three-fold function: firstly they enable the elementary net to adhere closely to the frame and to be suspended therefrom; secondly it also enables the elementary net to slide on said frame, and finally, once the elementary net has been engaged by the aircraft, it permits a substantial reduction in the mesh size of the net, the horizontal strap sections between two adjacent rings being bent to a V configuration. Thus, a greater spacing between the vertical straps can be used.

In order to afford a clearer understanding of this invention, a typical form of embodiment of an aircraft arrester net gear constructed according to the teachings of this invention will now be described by way of example with reference to the attached drawing, in which

DESCRIPTION OF THE PREFERRED EMBODIMENT

Figure 1:
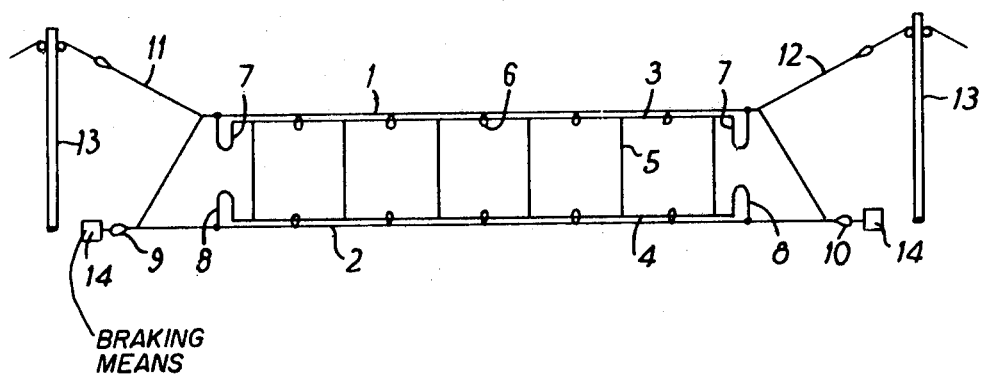
FIG. 1 is a diagrammatic front elevational view of an elementary net structure.

Referring to FIG. 1, in an aircraft arrester net gear according to the present invention, the frame comprises a pair of vertically spaced horizontal straps 1, 2 and the elementary net comprises a pair of horizontal straps 3, 4 and a plurality of spaced vertical straps 5 extending between these horizontal straps 3, 4, as shown. The means for guiding the sliding movements of the horizontal straps 3, 4 consist of rings 6, for example of strap material, shown diagrammatically in the drawing and attached to the frame. The slack section provided on the upper horizontal strap 3 of the elementary net is provided on each side by an open loop 7 and the slack section of the lower horizontal strap 4 consists on each side of another open loop 8. The closed loops 9, 10 formed at the ends of the lower strap 4 are connected to the braking device (not shown since it is no part of the present invention) and the terminal portions 11 and 12 of the upper horizontal strap 3 are connected to the suspension stanchions (not shown).

Of course, a plurality of elementary nets may be mounted in parallel positions on a common frame; thus, five or ten such elementary nets may be used, this number depending on the available maintenance or repairs facilities.

Figure 3:
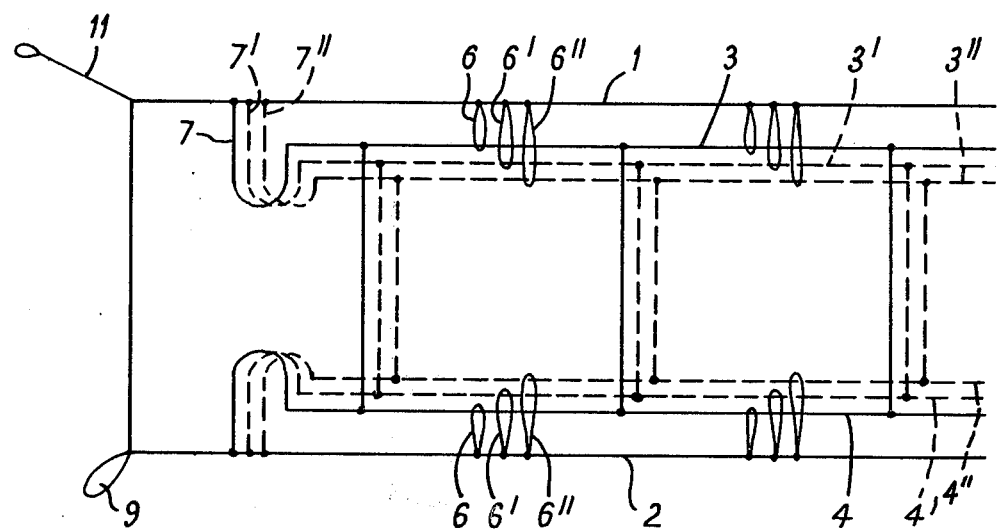
FIG. 3 is a diagrammatic front elevational view of a plural net structure.

FIG. 3 shows a structure in which a plurality of elementary nets 3, 3', 3" are shown mounted on a common frame and having respective loops 6, 6', 6".

This net gear operates as follows:

The net is suspended by means of straps 11 and 12 so that the efforts exerted when raising the net will not reduce the length of the slack open loops of the elementary net in relation to the frame. Thus, if a forwardly projecting portion of the aircraft, such as a front aerial, engages the vertical strap 5, the complete elementary net will slide on its frame, thus absorbing the slack sections 7 and 8. Inasmuch as the other elementary nets are partially carried along, they will also absorb their slack section or open loops.

Figure 2:
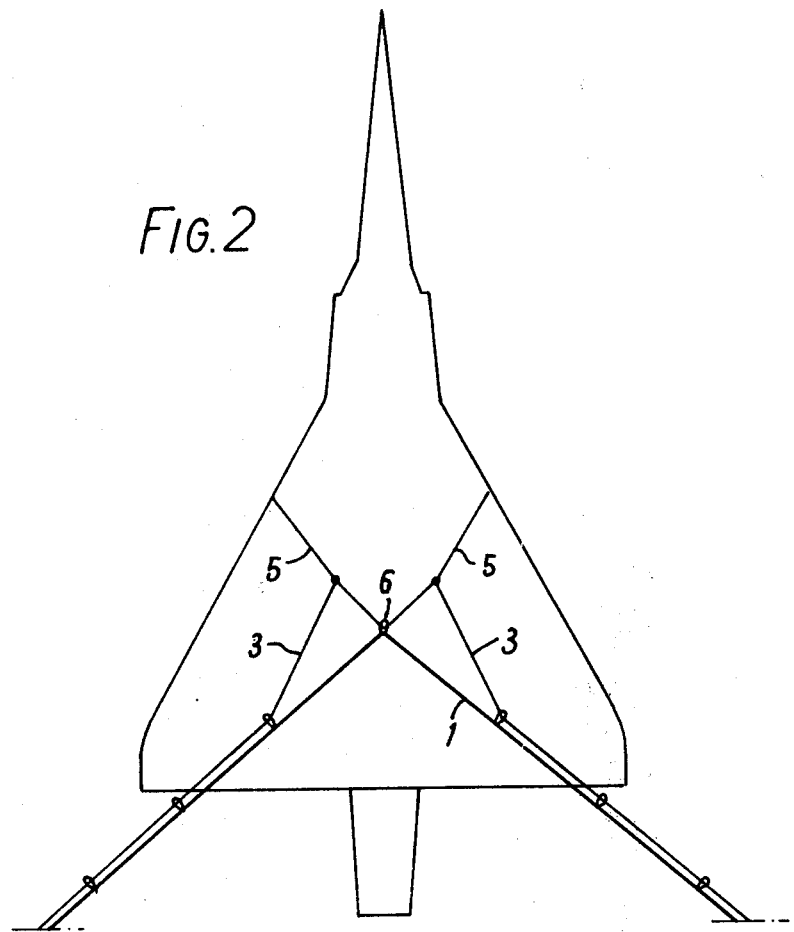
FIG. 2 is a diagrammatic plane view from above showing the action exerted by an aircraft engaging the net structure of FIG. 1.

On the aircraft proper, the normal elementary net, i.e. the net not engaged by a particularly advanced portion of the aircraft, will assume the configuration shown diagrammatically in FIG. 2, which shows clearly the mesh constriction due to the sliding movements of rings 6.

Of course, this invention may be used for arresting all types of aircrafts; however, it is particularly efficient and useful for use when aircrafts of different wing spans are likely to utilize this arrester net gear on a same airfield.

What we claim is:

1. An aircraft arrester net gear comprising:
   (i) a supporting frame consisting of
      an upper horizontal strap connected at its ends to posts for raising the net and to braking means,
      a lower horizontal strap connected at its ends to said braking means,
   (ii) at least one elementary net slidingly mounted on said supporting frame, said at least one elementary net comprising:
      an upper horizontal strap having slack at both ends,
      a lower horizontal strap having slack at both ends,
      vertical straps connecting said horizontal upper and lower straps of said at least one elementary net,
   (iii) unbreakable connecting means rigid with the upper horizontal strap of the frame and presenting loops in which can slide the upper horizontal strap of the at least one elementary net,
      unbreakable connecting means rigid with the lower horizontal strap of the frame and presenting loops in which can slide the lower horizontal strap of the at least one elementary net, whereby when the arrester net gear is engaged by an aircraft said at least one elementary net can slide laterally, the vertical straps forming a net mesh and being brought nearer together by engagement with the aircraft thus permitting a greater spacing between the vertical straps of the net, and the whole arrester net gear following the aircraft and thus actuating the braking means through the upper horizontal strap of the frame as well as through the lower horizontal strap of the frame.

2. An aircraft arrester net gear, as claimed in claim 1, comprising a plurality of elementary nets slidingly mounted on the supporting frame.

* * * * *